United States Patent
Rinne et al.

(10) Patent No.: US 11,576,222 B2
(45) Date of Patent: Feb. 7, 2023

(54) PROTOCOL DATA UNIT SESSION SPLITTING FUNCTION AND SIGNALING

(71) Applicant: Nokia Technologies Oy, Espoo (FI)

(72) Inventors: Mika Rinne, Espoo (FI); Matti Laitila, Oulu (FI)

(73) Assignee: Nokia Technologies Oy, Espoo (FI)

(*) Notice: Subject to any disclaimer, the term of this patent is extended or adjusted under 35 U.S.C. 154(b) by 108 days.

(21) Appl. No.: 16/612,726

(22) PCT Filed: May 11, 2018

(86) PCT No.: PCT/FI2018/050356
§ 371 (c)(1),
(2) Date: Nov. 11, 2019

(87) PCT Pub. No.: WO2018/206855
PCT Pub. Date: Nov. 15, 2018

(65) Prior Publication Data
US 2020/0084815 A1 Mar. 12, 2020

Related U.S. Application Data

(60) Provisional application No. 62/505,336, filed on May 12, 2017.

(51) Int. Cl.
*H04W 76/15* (2018.01)
*H04W 76/12* (2018.01)
(Continued)

(52) U.S. Cl.
CPC ....... *H04W 76/15* (2018.02); *H04W 28/0268* (2013.01); *H04W 28/10* (2013.01);
(Continued)

(58) Field of Classification Search
None
See application file for complete search history.

(56) References Cited

U.S. PATENT DOCUMENTS

2013/0091485 A1* 4/2013 Colombo ............... G06F 8/10
717/101
2015/0264562 A1* 9/2015 Wu ....................... H04W 12/04
380/270
(Continued)

FOREIGN PATENT DOCUMENTS

| CN | 102098725 A | 6/2011 |
| CN | 103039109 A | 4/2013 |

(Continued)

OTHER PUBLICATIONS

Office action received for corresponding Russian Patent Application No. 2019137618, dated Jul. 17, 2020, 9 pages of office action and 5 pages of Translation available.
(Continued)

*Primary Examiner* — Edan Orgad
*Assistant Examiner* — Emmanuel K Maglo
(74) *Attorney, Agent, or Firm* — Joseph C. Drish; Harrington & Smith (57) ABSTRACT

Systems, methods, apparatuses, and computer program products relating to packet data unit (PDU) session, for example, in 5G or new radio access technology (NR). One method may include receiving a configuration for how to handle flows to two network nodes for transmission. The method may include directing the flows of an incoming PDU session to two network nodes for the transmission.

20 Claims, 6 Drawing Sheets

(51) Int. Cl.
*H04W 76/22* (2018.01)
*H04W 76/11* (2018.01)
*H04W 28/02* (2009.01)
*H04W 28/10* (2009.01)
*H04W 80/02* (2009.01)

(52) U.S. Cl.
CPC ............ *H04W 76/11* (2018.02); *H04W 76/12* (2018.02); *H04W 76/22* (2018.02); *H04W 80/02* (2013.01)

(56) References Cited

U.S. PATENT DOCUMENTS

| | | | | |
|---|---|---|---|---|
| 2016/0337925 | A1* | 11/2016 | Fujishiro | H04W 36/0058 |
| 2017/0055283 | A1 | 2/2017 | Shrivastava et al. | |
| 2018/0083688 | A1* | 3/2018 | Agiwal | H04W 12/04 |
| 2018/0279193 | A1* | 9/2018 | Park | H04W 36/08 |
| 2018/0279376 | A1* | 9/2018 | Dinan | H04W 74/0833 |
| 2018/0317086 | A1* | 11/2018 | Ben Henda | H04W 12/0431 |
| 2018/0324663 | A1* | 11/2018 | Park | H04W 36/0069 |
| 2018/0324714 | A1* | 11/2018 | Yang | H04W 72/10 |
| 2018/0352470 | A1* | 12/2018 | Turtinen | H04L 45/306 |
| 2019/0373519 | A1* | 12/2019 | Yiu | H04W 36/08 |
| 2020/0120736 | A1* | 4/2020 | Xu | H04W 28/085 |
| 2020/0404531 | A1* | 12/2020 | Bogineni | H04W 76/12 |

FOREIGN PATENT DOCUMENTS

| | | |
|---|---|---|
| CN | 103988546 A | 8/2014 |
| RU | 2611721 C1 | 2/2017 |

OTHER PUBLICATIONS

"3rd Generation Partnership Project; Technical Specification Group Services and System Aspects; Study on Architecture for Next Generation System (Release 14)", 3GPP TR 23.799, V14.0.0, Dec. 2016, pp. 1-522.

"LS on Dual Connectivity with 5GC", 3GPP TSG-SA WG2 meeting #120, S2-172782, NTT DOCOMO, Mar. 27-31, 2017, 1 page.

"3rd Generation Partnership Project; Technical Specification Group Radio Access Network; NG Radio Access Network; Overall Description; Stage 2 (Release 15)", 3GPP TS 38.300, V0.1.0, Mar. 2017, pp. 1-29.

"3rd Generation Partnership Project; Technical Specification Group Services and System Aspects; System Architecture for the 5G System; Stage 2 (Release 15)", 3GPP TS 23.501 V0.3.1, Mar. 2017, pp. 1-101.

International Search Report and Written Opinion received for corresponding Patent Cooperation Treaty Application No. PCT/FI2018/050356, dated Jul. 26, 2018, 14 pages.

"Flow QoS Support in Dual Connectivity", 3GPP TSG-RAN WG3 meeting #96, R3-171796, Qualcomm Incorporated, May 15-19, 2017, 2 page.

"Flow Control Over the X2 Interface for Split Bearer", 3GPP TSG-RAN WG3 meeting #83bis, R3-140614, NSN, Mar. 31-Apr. 4, 2014, 6 page.

Office action received for corresponding European Patent Application No. 18728680.2, dated Sep. 10, 2020, 7 pages.

Office action received for corresponding European Patent Application No. 18728680.2, dated Mar. 11, 2021, 5 pages.

* cited by examiner

PROTOCOL DATA UNIT SESSION SPLITTING FUNCTION AND SIGNALING

RELATED APPLICATION

This application was originally filed as PCT Application No. PCT/FI2018/050356, filed on 11 May 2018, which claims priority from U.S. Provisional Application No. 62/505,336, filed on 12 May 2017.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to splitting of the data flow of a protocol data unit (PDU) in 5G.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

5th generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

For 5G, radical innovation is also expected for the core network functionality, architecture and network function virtualization in the form of clouded software. These changes will also imply new interfaces between the core network and the radio access network and novel handling of traffic flows. Media types of flows may naturally be anything imagined from the current to future possibilities, including 3D virtuals with augmented reality.

SUMMARY

One embodiment is directed to a method that may include receiving, by a user plane network node, an indication for how to split flows of at least one protocol data unit (PDU) session into at least two flows for transmissions between at least two network nodes wherein at least a first flow is transmitted to a master network node and in a secondary network node. The method may also include directing the flows of the at least one packet data unit (PDU) session appropriately for transmission in the master network node and at least a second flow is transmitted to the secondary network node according to the received indication.

Another embodiment is directed to an apparatus that may include at least one processor and at least one memory comprising computer program code. The at least one memory and computer program code may be configured, with the at least one processor, to cause the apparatus at least to receive an indication for how to split flows of at least one protocol data unit (PDU) session into at least two flows between at least two network nodes where at least a first flow is transmitted to a master network node and at least a second flow is transmitted to a secondary network node, and to direct the flows of the at least one packet data unit (PDU)

session appropriately for transmission in the master network node and in the secondary network node according to the received indication.

Another embodiment is directed to an apparatus that may include receiving means for receiving an indication for how to split flows of at least one protocol data unit (PDU) session into at least two flows between at least two network nodes where at least a first flow is transmitted to in a master network node and at least a second flow is transmitted to a secondary network node. The apparatus may also include directing means for directing the flows of the at least one packet data unit (PDU) session appropriately for transmission in the master network node and in the secondary network node according to the received indication.

Another embodiment is directed to a non-transitory computer readable medium comprising program instructions stored thereon for performing at least the following: receiving an indication for how to split flows of at least one protocol data unit (PDU) session into at least two flows between at least two network nodes, where at least a first flow is transmitted to in a master network node and at least a second flow is transmitted to in a secondary network node, and directing the flows of the at least one packet data unit (PDU) session appropriately for transmission in the master network node and in the secondary network node according to the received indication.

Another embodiment is directed to a method that may include receiving a modification indication indicating that a master network node has reconfigured one or more of a master cell group (MCG) bearer to one or more secondary cell group (SCG) bearer, and informing a user plane network node on how to split the flows of a packet data unit (PDU) session into at least two flows for transmissions between at least two network nodes.

Another embodiment is directed to an apparatus that may include at least one processor and at least one memory comprising computer program code. The at least one memory and computer program code may be configured, with the at least one processor, to cause the apparatus at least to receive a modification indication indicating that a master network node has reconfigured one or more of a master cell group (MCG) bearer to one or more secondary cell group (SCG) bearer, and to inform a user plane network node on how to split the flows of a packet data unit (PDU) session into at least two flows for transmissions between at least two network nodes.

Another embodiment is directed to an apparatus that may include receiving means for receiving a modification indication indicating that a master network node has reconfigured one or more of a master cell group (MCG) bearer to one or more secondary cell group (SCG) bearer, and informing means for informing a user plane network node on how to split the flows of a packet data unit (PDU) session into at least two flows for transmissions between at least two network nodes.

A non-transitory computer readable medium comprising program instructions stored thereon for performing at least the following: receiving a modification indication indicating that a master network node has reconfigured one or more of a master cell group (MCG) bearer to one or more secondary cell group (SCG) bearer, and informing a user plane network node on how to split the flows of a packet data unit (PDU) session into at least two flows for transmissions between at least two network nodes.

Another embodiment is directed to a method that may include transmitting, to a user plane network node, at least one of a configuration, a configuration indication, and a modification indication for how to split flows of at least one protocol data unit (PDU) session into at least two network nodes for transmission as a first bearer in a master network node and as a second bearer in a secondary network node.

Another embodiment is directed to a method that may include transmitting, to at least one of an access management function (AMF) and session management function (SMF), an indication for how to split flows of at least one protocol data unit (PDU) session into at least two flows for transmissions between at least two network nodes where at least a first flow is transmitted as a first bearer in a master network node and at least a second flow is transmitted as a second bearer in a secondary network node.

Another embodiment is directed to an apparatus that may include at least one processor and at least one memory comprising computer program code. The at least one memory and computer program code may be configured, with the at least one processor, to cause the apparatus at least to transmit, to at least one of an access management function (AMF) and session management function (SMF), an indication for how to split flows of at least one protocol data unit (PDU) session into at least two flows for transmissions between at least two network nodes where at least a first flow is transmitted as a first bearer in a master network node and at least a second flow is transmitted as a second bearer in a secondary network node, to configure the user plane network node.

Another embodiment is directed to an apparatus that may include transmitting means for transmitting, to at least one of an access management function (AMF) and session management function (SMF), an indication for how to split flows of at least one protocol data unit (PDU) session into at least two flows for transmissions between at least two network nodes where at least a first flow is transmitted as a first bearer in a master network node and at least a second flow is transmitted as a second bearer in a secondary network node.

A non-transitory computer readable medium comprising program instructions stored thereon for performing at least the following: transmitting, to at least one of an access management function (AMF) and session management function (SMF), an indication for how to split flows of at least one protocol data unit (PDU) session into at least two flows for transmissions between at least two network nodes where at least a first flow is transmitted as a first bearer in a master network node and at least a second flow is transmitted as a second bearer in a secondary network node.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products relating to PDU session splitting, for example, in 5G or new radio access technology (NR), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The 5G quality of service (QoS) framework is based on the QoS flows that RAN can independently map to the radio bearers. This is different from the earlier generations (e.g., LTE), where bearers existed in an end-to-end manner between the PDN gateway and the UE, over the radio access bearers.

In a radio access network, dual connectivity configuration can be defined per UE at will by the RAN eNB. These radio resource configurations may involve two (or more) gNBs, which can be defined to operate in one or more of the four radio bearer types. These bearer types are Master Cell Group (MCG) bearer, MCG split bearer, Secondary Cell Group (SCG) bearer and SCG split bearer. The MCG bearer uses resources of the master gNB, and the MCG split bearer uses resources of both the master node and the secondary node with the radio bearer terminating in the master node. The SCG bearer uses resources of the secondary gNB, and the SCG split bearer uses resources of both the secondary node and the master node with the radio bearer terminating in the secondary node. All bearer types use radio resource configurations by the Radio Resource Control (RRC) protocol of the master node, but the SCG bearer types additionally use RRC protocol of the secondary node. In the present disclosure, the MCG and MCG split bearer types may both be referred to as MCG bearer; similarly, the SCG bearer and SCG split bearer types may both be referred to as SCG bearer.

According to an embodiment, in a SCG bearer type of dual connectivity (DC), the core network splits the data flows of a PDU session towards a master gNB and to a secondary gNB. This may be necessary because the RAN defines how QoS flows are served by the data radio bearer (DRB) configurations. The RAN manages, controls, optimizes and implements the QoS flow to DRB mapping. In case the RAN defines the QoS to DRB mapping in a manner involving MCG to SCG bearer type changes, the RAN informs the core network of this changed mapping, and the core network splits the PDU session accordingly. Splitting a PDU session means splitting data packets of the flows contained in a PDU session properly to the master gNB and to the secondary gNB. In a desired implementation, the packets of the same flow are directed to the same DRB and different flows (packets therein) may be directed to different DRBs. Naturally, multiple flows may be directed to the same DRB, e.g., whenever their QoS treatment is expected to be similar in the RAN. An embodiment of the present disclosure provides methods for how RAN can configure the splitting function in a core network so that it matches with the radio bearer configuration.

Certain embodiments relate to 5G technology, where the association between the UE and a packet data network is based on PDU sessions. The packet data network may be of type Internet Protocol (IP) network or Ethernet as an example. Some embodiments may apply in the Next Generation Radio Access Network (NG-RAN) node serving the air interface for a UE or many UEs. It is noted that one UE may have one or more PDU sessions. Typically, data flows of one PDU session are delivered over one RAN node to the UE, or from the UE via one RAN node to the packet data network. An embodiment applies, for example, when a PDU session needs to become served by multiple RAN nodes being involved in the bearer configuration. This happens whenever so called dual-connectivity or multi-connectivity is configured and when the configured bearer types have user-plane interfaces between more than one RAN node and the core network.

In 5G, PDU sessions are defined between the 5G-CN and UE through the User Plane Function (UPF) hosting the gateway functionality and through the serving gNB. So far, it has been defined that one PDU session carried between the 5G-CN and the NG-RAN is terminated at a single RAN node. One PDU session is between one UPF instance in one serving gateway (SGW) and one gNB. This is valid even if there would be multiple PDU sessions active for a UE. Further, it was defined that the user-plane has an adaptation protocol in the radio access network (gNB), the adaptation layer which converts the PDU sessions to the Data Radio Bearers (DRBs). One PDU session, which carries multiple QoS flows, can be mapped to multiple DRBs based on their QoS requirements.

On the other hand, dual connectivity configurations are defined, where the NR gNB acts as the master node (MgNB) of the dual connectivity and another NR gNB acts as the secondary node (SgNB). For dual connectivity, the following four bearer types have been defined: the Master Cell Group (MCG) bearer, the MCG split bearer, the Secondary Cell Group (SCG) bearer, and the SCG split bearer.

A problem arises when a PDU session mapped to use MCG bearer types faces the issue that the MgNB reconfigures any of the MCG bearer types to SCG bearer types, one PDU session would need to be split so that some of the flows of the PDU session are delivered to the MgNB (to use the MCG bearer types) and some other flows of the same PDU session would need to be delivered to the SgNB (to use the SCG bearer types).

Therefore, certain embodiments are directed to methods and apparatuses for splitting flows of one PDU session to two gNB nodes, for example, for the transmission as an MCG bearer type in the MgNB and as an SCG bearer type in the SgNB. In addition, certain embodiments cover approaches for merging flows of one PDU session from the SgNB to the MgNB, when SCG bearer types get reconfigured to the MCG bearer types.

Figure 1A:
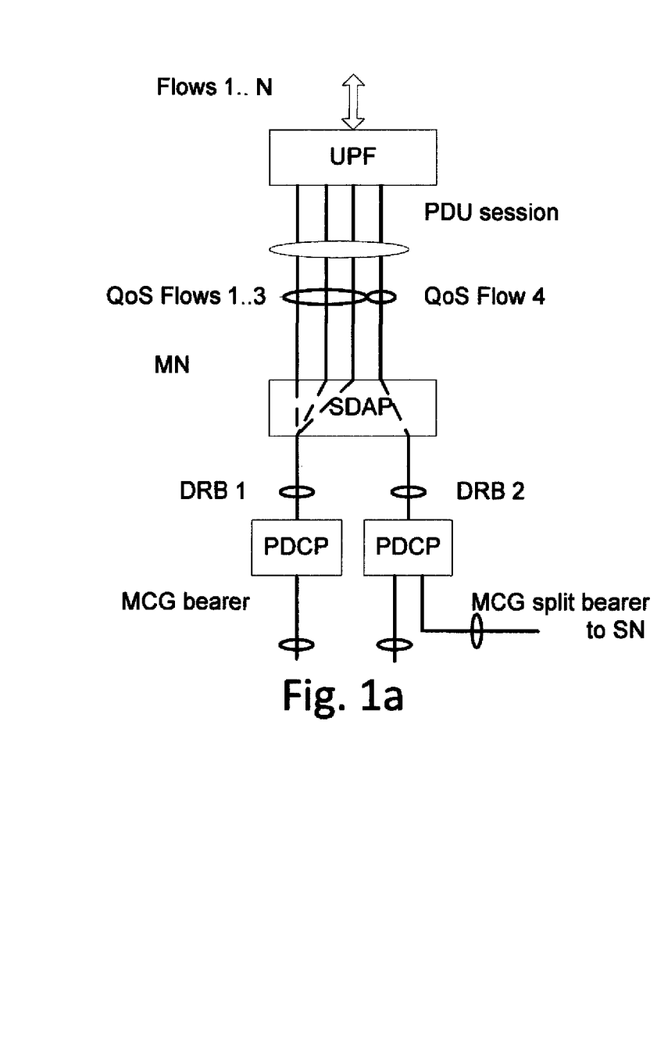
FIG. 1a illustrates an example block diagram depicting the handling of a PDU session and its service flows by a single RAN node, according to an embodiment.
Figure 1B:
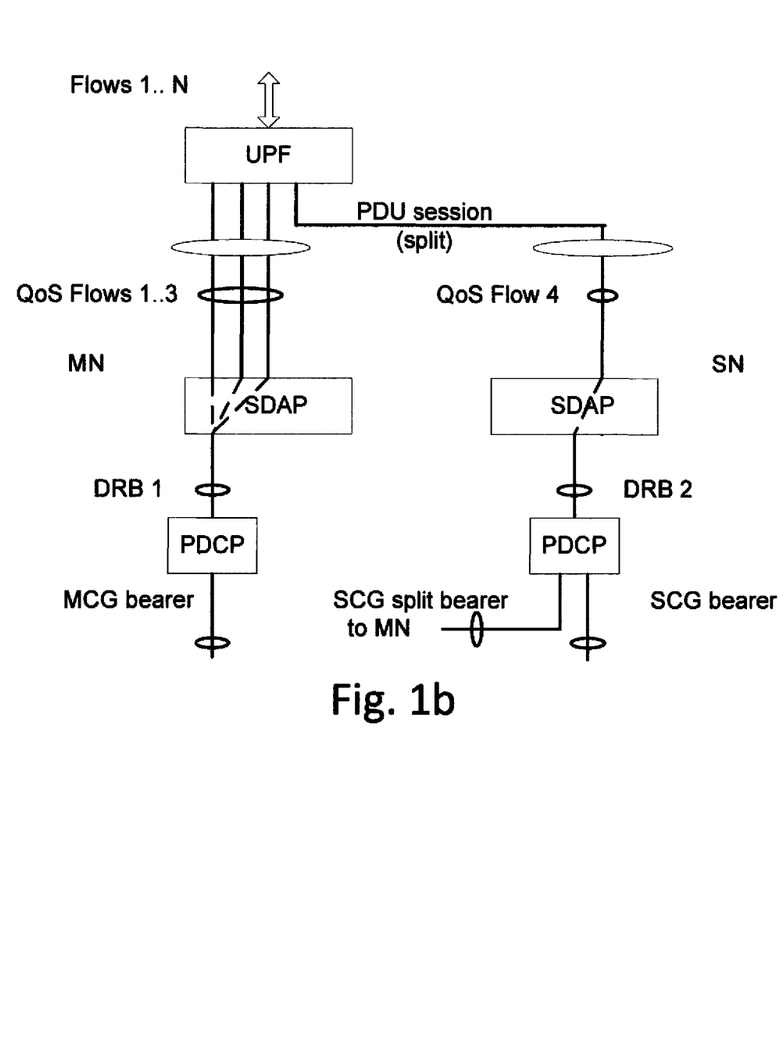
FIG. 1b illustrates an example block diagram depicting the re-configuring of the bearers and splitting of a PDU session, according to an embodiment.

One embodiment may be directed to the functionality and signalling to split the PDU session, as illustrated in the example of FIG. 1. For instance, FIG. 1a illustrates an example of the handling of a PDU session and its service flows (QoS flows) by a single RAN node, according to an embodiment. FIG. 1b illustrates an example of the re-configuring of the bearers and hence splitting the PDU session at the UPF to be served by two RAN nodes and MCG-bearer and SCG-bearer types respectively, according to an embodiment. In an embodiment, a PDU session may carry one or multiple flows, where the flows may be of different quality of service. Different flows of different quality may be identified by their QoS labels.

According to an embodiment, the PDU session may be split in a manner taking into account the QoS flows and their requirements for the PDU session to DRB mapping. It is noted that bearer reconfigurations happen by radio reasons and are in full control by the RAN nodes (i.e., eNB, gNB or two gNBs either alone or together). Hence, there may be a need to include into the NG-ModificationIndication signalling, which handles the user-plane path-switch between the MgNB to the SgNB, information so that the UPF of the 5G-CN can know how to split the QoS flows of a PDU session to these bearers. The UPF may not have any information regarding how the PDU session and its QoS flows are mapped to different bearers, because this mapping happens in the gNB by an adaptation protocol. This need may appear because the gNB may reconfigure the bearers from MCG types to SCG types, which means that the UPF needs to know which flows it shall direct to the MgNB for the DRB mapping and which flows to the SgNB for the DRB mapping. In the other direction of change, when the SCG bearers get configured (back) to MCG bearers, the path-switch request may contain information which flows in this manner get gathered to the PDU session delivery to the MgNB.

Embodiments of the present disclosure work smoothly with network slicing. Namely, one network slice may use one or more PDU session(s), but a single PDU session will not serve multiple network slices. Therefore, when a PDU session is split or merged by an embodiment as described herein, the network slice does not become impacted but remains served by that PDU session and its QoS flows. It is noted that a network slice refers to a complete logical network that is comprised of a set of network functions and corresponding resources necessary to provide certain network capabilities and network characteristics. It includes both a 5G-AN and a 5G CN. A network slice instance (NSI) is the instantiation of a network slice, i.e., a deployed set of network functions delivering the intended network slice services according to a network slice template.

Certain embodiments may have several variants, for example, where the nodes in dual connectivity may both be of type gNBs, or one of them may be of type eNB and one a gNB. Some embodiments may also include, when a PDU session is split/merged between more than two nodes, any of which are of type gNB or eNB. The type of eNB may further be noted as an eNB which can connect to the 5G-CN, which is hence known as the evolved LTE eNB, i.e., eLTE eNB. An embodiment is applicable to the Evolved Packet Core (EPC) network equally well, if it is defined to have PDU sessions similar to the 5G-CN, or to both, if the core networks are merged, bound, virtualized or clouded somehow together.

Figure 2:
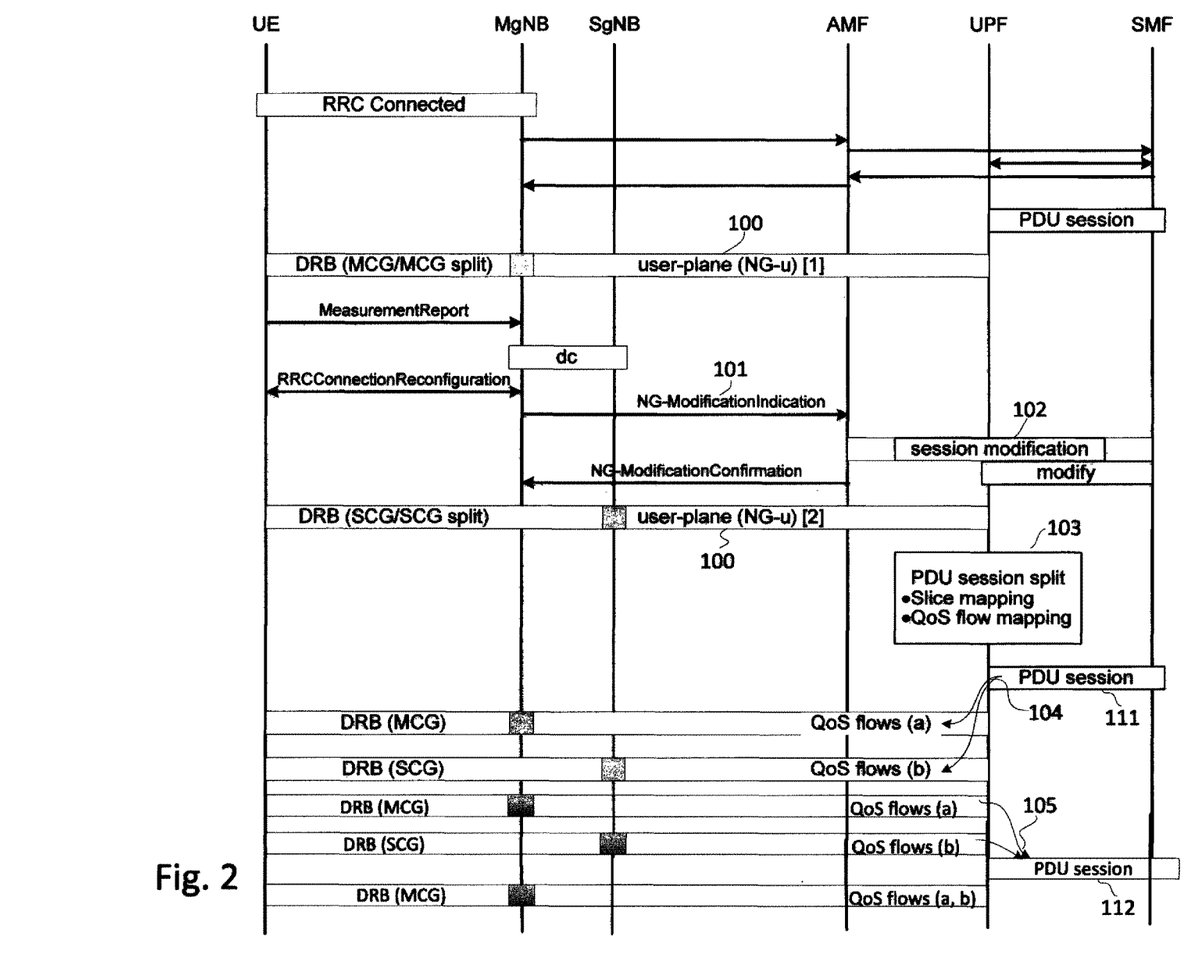
FIG. 2 illustrates an example message sequence diagram, according to one embodiment.

FIG. 2 illustrates an example message sequence chart for splitting a PDU session and its QoS flows to two serving RAN nodes and MCG- and SCG-bearer types, respectively, according to an example embodiment. FIG. 2 includes a user-plane setup for the PDU session delivery and RRC configuration to map the flows of a PDU session to DRBs. In addition, FIG. 2 depicts what may occur when the gNB makes a reconfiguration between the MCG bearer types and SCG bearer types. This may require NG-ModificationIndication signalling, which informs the UPF to deliver selected (or all) flows to the SgNB instead of MgNB.

In certain embodiments, a NG-ModificationIndication may occur in different ways. For example, in one embodiment as illustrated in FIG. 2, at 101, the NG-ModificationIndication may be transmitted to the Access and Mobility Management Function (AMF), which may negotiate the session modification with the Session Management Function (SMF), at 102. In other embodiments, either the AMF or the SMF may configure the UPF, respectively. According to another embodiment, it is also possible that only one of the AMF or the SMF will have an impact, or it is possible to have AMF and SMF implemented together as a single unit. In other alternatives, the involvement of the AMF and/or the SMF may be different or reduced. In a further embodiment, the NG-ModificationIndication may be delivered embedded as user-plane information, at 100, directly to the UPF without involvement of the AMF and/or SMF.

In an embodiment, the UPF may check the ID of an incoming PDU session 111 (or knows it based on the NG-u tunnel) and, if that PDU session 111 became modified to type 'split' (information present in the UPF), the UPF may check, at 103, per QoS label to which tunnel the QoS flow will be destined to. The UPF may then split the flows of the incoming PDU session 111 accordingly, at 104. In certain embodiments, the UPF may also be optionally configured to merge the flows from a split PDU session 112 back to a MCG bearer type not involving SgNB, at 105.

It is noted that, as described herein, NG-ModificationIndication is used as an example procedure name similar to E-RAB ModificationIndication that is in use in LTE. In an embodiment, NG-ModificationIndication refers to a procedure to modify the interface between the RAN and the 5G-CN. This interface may not have E-RABs and it may be more generically called NG-interface or NG-connectivity.

As one example, before reconfiguration, a data bearer 1 (DRB ID-1) is served by a gNB-1, and the UE identity in that gNB is: gNB UE NG-AP ID-1. After the reconfiguration, DRB ID-1 becomes served by two gNBs, and the UE identity in them are gNB UE NG-AP ID-1 and gNB UE NG-AP ID-2, respectively. It is noted that NG-AP refers to the NG-interface Application Protocol (similar to S1AP in LTE), and hence it serves as a UE identification at this interface. The user-plane address for data delivery to a given gNB are the IP address and the Tunnel End Point Identifier (TEID) of the GTP-u tunnel. According to this, an example is given:

Before reconfiguration:
PDU Session ID-x {QoS-flow1, QoS-flow2, QoS-flow3};
gNB UE NG-AP ID-1.

After reconfiguration:
PDU Session ID-x {QoS-flow1, QoS-flow2}; gNB UE NG-AP ID-1;
PDU Session ID-x {QoS-flow3}; gNB UE NG-AP ID-2.

If the QoS flows 1, 2 and QoS flow 3 use the same tunnel (T1), the change needs to involve first a tunnel (T2) setup to the new SgNB and then extraction of QoS flow 3 out of tunnel (T1) and move it to tunnel (T2).

If the Qos flows 1,2 and QoS flow 3 already use different tunnels (say T1, T2, T3), only the tunnel (T3) facing the change need the signalling: PDU Session ID-x {QoS-flow3}; gNB UE NG-AP ID-1 will change to PDU Session ID-x {QoS flow3}; gNB UE NG-AP ID-2.

When AMF and/or SMF are involved according to an embodiment of the invention, the signalling may include the following. For gNB to AMF (gNB-→AMF): UE ID/PDU Session ID-x/type of modification="split"/{QoS-flow 1, QoS-flow2, QoS-flow-3} gNB UE NG-AP ID-1-→{QoS-flow 1, QoS-flow2} gNB UE NG-AP ID-1; {QoS-flow 3} gNB UE NG-AP ID-2. The AMF knows the NG-AP TEIDs. TEIDs are not needed in this Information Element, if they are given in another place for the tunnel management procedure based on the gNB request. For AMF to SMF (AMF-→SMF): UE ID/PDU Session ID-x/type of modification="split"/{QoS-flow 1, QoS-flow 2, QoS-flow-3} gNB UE NG-AP ID-1-→{QoS-flow 1, QoS-flow2} gNB UE NG-AP ID-1; {QoS-flow 3} gNB UE NG-AP ID-2. The SMF needs the NG-AP TEIDs from AMF. For SMF to UPF (SMF-→UPF): UE ID/PDU Session ID-x/{QoS-flow 1, QoS-flow2, QoS-flow-3} gNB UE NG-AP ID-1-→{QoS-flow 1, QoS-flow2} gNB UE NG-AP ID-1; {QoS-flow 3} gNB UE NG-AP ID-2. The UPF needs the flow to tunnel mapping information.

Figure 3A:
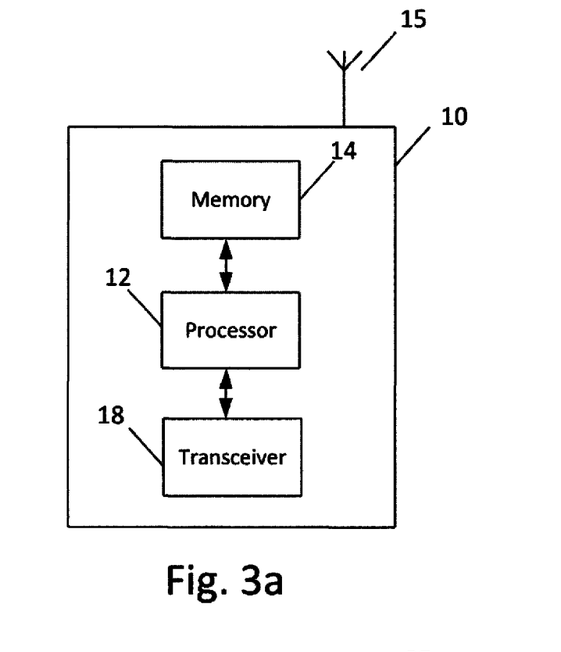
FIG. 3a illustrates an example block diagram of an apparatus, according to an embodiment.

FIG. 3a illustrates an example of an apparatus 10 according to an embodiment. In an embodiment, apparatus 10 may be a node, host, or server in a communications network or serving such a network. For example, in some embodiments, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR. In an embodiment, as will be discussed below, apparatus 10 may be a network node that handles user-plane path switching between a master node B (MgNB) and secondary node B (SgNB).

It should be understood that apparatus 10 may be comprised of an edge cloud server as a distributed computing system where the server and the radio node may be standalone apparatuses communicating with each other via a radio path or via a wired connection, or they may be located in a same entity communicating via a wired connection. It should be noted that one of ordinary skill in the art would understand that apparatus 10 may include components or features not shown in FIG. 3a.

As illustrated in FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, as mentioned above, apparatus 10 may be a network node that handles user-plane path switching between a master node B (e.g., MgNB) and secondary node B (e.g., SgNB). For example, in this embodiment, apparatus 10 may be or may include a user plane function or entity (i.e., UPF). According to certain embodiments, apparatus 10 may be controlled by memory 14 and processor 12 to perform the functions associated with any of the embodiments described herein.

In an embodiment, apparatus 10 may be controlled by memory 14 and processor 12 to receive a configuration for how to split flows (e.g., QoS flows) of one PDU session into at least two gNB nodes for transmission as an MCG bearer type in a MgNB and as an SCG bearer type in a SgNB. For instance, in some embodiments, the configuration for how to split the flows of the PDU session may be received from an AMF and/or SMF, and may be received when the MgNB reconfigures any of the MCG bearer types to SCG bearer types. As a result, apparatus 10 will know which flows it should direct to the MgNB for the DRB mapping and which flows it should direct to the SgNB for the DRB mapping.

In another embodiment, apparatus 10 may be controlled by memory 14 and processor 12 to directly receive a modification indication (e.g., NG-ModificationIndication) comprising information on how to split flows (e.g., QoS flows) of one PDU session into at least two gNB nodes for the transmission as an MCG bearer type in a MgNB and as an SCG bearer type in a SgNB. According to one embodiment, the modification indication may be embedded as user-plane information directly provided to the UPF without involvement of the AMF and/or SMF. For example, modification information may be present inside the user plane tunnel between the gNB and the UPF (apparatus 10) directly. This modification information may, for example, be piggy-packed into the tunnel headers (e.g., GTP-u tunnel extension header). In some embodiments, apparatus 10 may be controlled by memory 14 and processor 12 to split the flows based on the received configuration information or modification indication.

According to an embodiment, when a PDU is received, apparatus 10 may be further controlled by memory 14 and processor 12 to check the incoming PDU session ID and, if the incoming PDU session has been modified to type 'split', apparatus 10 may be controlled by memory 14 and processor 12 to determine per QoS label to which tunnel the QoS flow is destined to. Based on that determination, apparatus 10 may then be controlled by memory 14 and processor 12 to appropriately direct the flows (e.g., QoS flows) of the PDU session to the at least two gNB nodes for the transmission as an MCG bearer type in the MgNB and as an SCG bearer type in the SgNB.

Figure 3B:
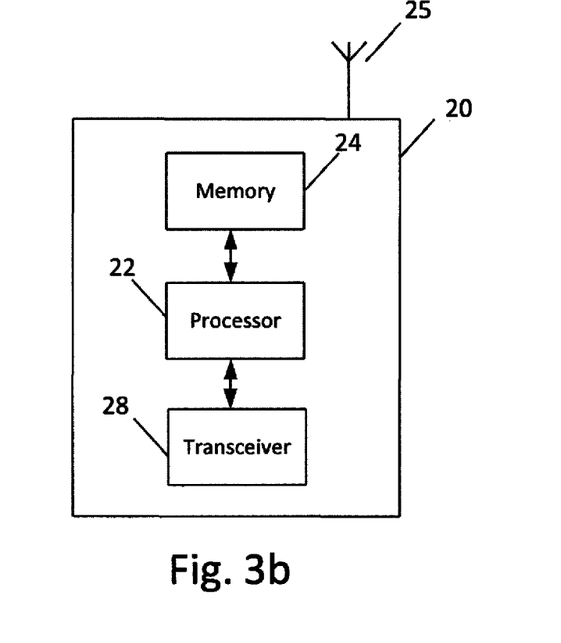
FIG. 3b illustrates an example block diagram of an apparatus, according to another embodiment.

FIG. 3b illustrates an example of an apparatus 20 according to another embodiment. In an embodiment, apparatus 20 may be a node, host, or server in a communications network or serving such a network. For example, apparatus 20 may be a base station, a node B, an evolved node B, 5G node B or access point, next generation node B (NG-NB or gNB), WLAN access point, mobility management entity (MME) or the like, or subscription server associated with a radio access network, such as a GSM network, LTE network, 5G or NR. In certain embodiments, apparatus 20 may be an access and mobility management entity or function (AMF) and/or may be a session management entity or function (SMF).

In some example embodiments, apparatus 20 may include one or more processors, one or more computer-readable storage medium (for example, memory, storage, and the like), one or more radio access components (for example, a modem, a transceiver, and the like). It should be understood that apparatus 20 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 20 may include components or features not shown in FIG. 3b.

As illustrated in FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, as mentioned above, apparatus 20 may be or may include an AMF and/or SMF. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to certain embodiments, apparatus 20 may be controlled by memory 24 and processor 22 to receive a modification indication (e.g., NG-ModificationIndication) indicating that a gNB (e.g., MgNB) has reconfigured one or more of the MCG bearer types to SCG bearer types. In an embodiment, apparatus 20 may be further controlled by memory 24 and processor 22 to decide how to split the flows (e.g., QoS flows) of a PDU session taking into account the QoS flows and their requirements for the PDU session to DRB mapping. According to one embodiment, apparatus 20 may then be further controlled by memory 24 and processor 22 to configure or inform the network node (e.g., UPF), which handles user-plane path switching between a master node B (e.g., MgNB) and secondary node B (e.g., SgNB), with information on how to split flows (e.g., QoS flows) of a PDU session into at least two gNB nodes for transmission as an MCG bearer type in a MgNB and as an SCG bearer type in a SgNB. In some embodiments, apparatus 20 may be controlled by memory 24 and processor 22 to configure or inform the network node via a NG-ModificationIndication. As a result, the network node will know which flows it should direct to the MgNB for the DRB mapping and which flows it should direct to the SgNB for the DRB mapping.

Figure 3C:
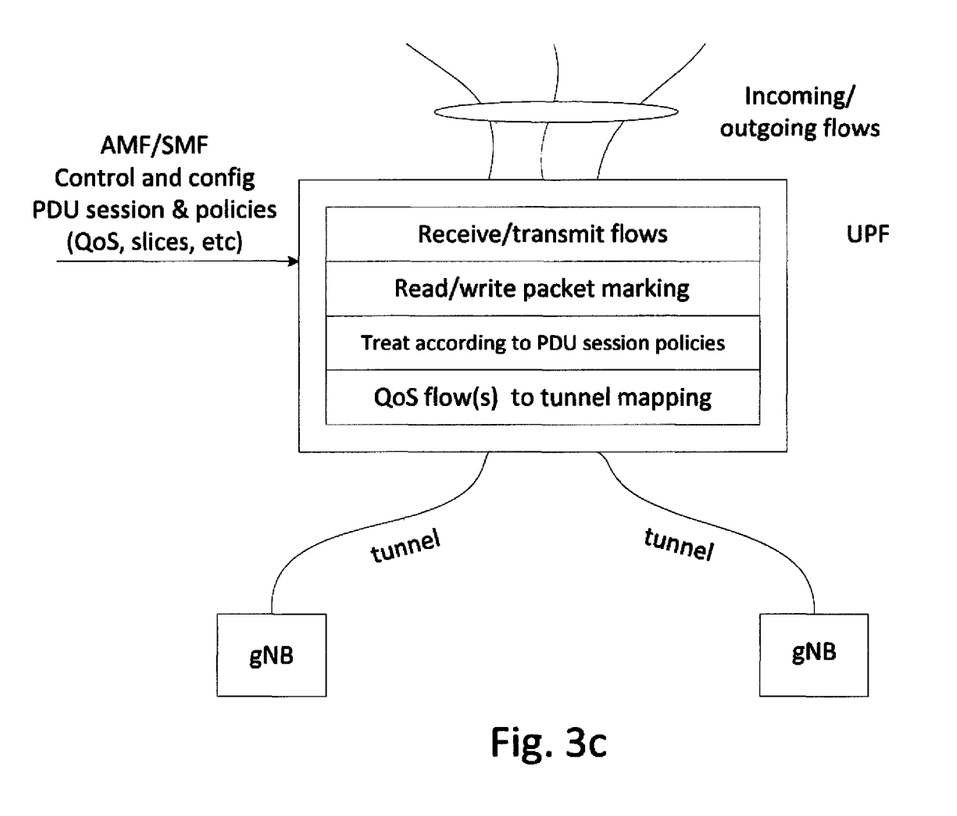
FIG. 3c illustrates an example block diagram of an apparatus, according to another embodiment.

FIG. 3c illustrates an example block diagram of a UPF and the functionality thereof, according to one embodiment.

In certain embodiments, the UPF may receive PDU session and policies, for example, from AMF and/or SMF. The UPF may be configured to receive/transmit flows, read/write packet markings, treat PDUs according to PDU session policies, and manage QoS flow(s) to tunnel mapping.

Figure 4A:
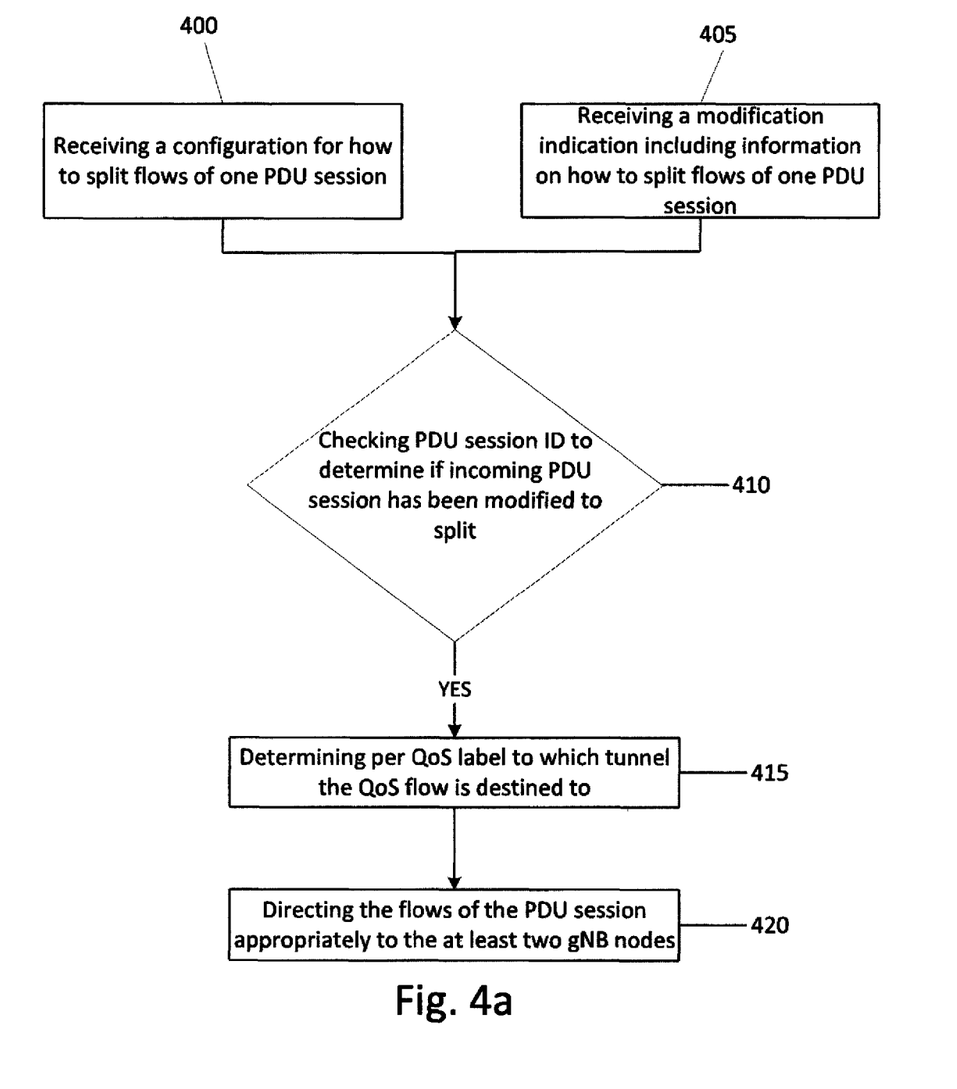
FIG. 4a illustrates an example flow diagram of a method, according to an embodiment.

FIG. 4a illustrates an example flow diagram of a method, according to one embodiment. The method of FIG. 4a may be performed, for example, by a network node, such as a network node that handles user-plane path switching between a master node B (e.g., MgNB) and secondary node B (e.g., SgNB). In an embodiment, the network node may be a UPF or the like. As illustrated in FIG. 4a, the method may include, at 400, receiving a configuration for how to split flows (e.g., QoS flows) of one PDU session into at least two gNB nodes for transmission as an MCG bearer type in a MgNB and as an SCG bearer type in a SgNB. For instance, in some embodiments, the configuration for how to split the flows of the PDU session may be received from an AMF and/or SMF, and may be received when the MgNB reconfigures any of the MCG bearer types to SCG bearer types. As a result, the network node (e.g., UPF) will know which flows it should direct to the MgNB for the DRB mapping and which flows it should direct to the SgNB for the DRB mapping.

In another embodiment, the method may include, at 405, directly receiving a modification indication (e.g., NG-ModificationIndication) comprising information on how to split flows (e.g., QoS flows) of one PDU session into at least two gNB nodes for the transmission as an MCG bearer type in a MgNB and as an SCG bearer type in a SgNB. According to an embodiment, the modification indication may be embedded as user-plane information directly provided to the network node (e.g., UPF) without involvement of an AMF and/or a SMF. For example, the modification information may be present inside the user plane tunnel between the gNB and the network node (UPF) directly. This modification information may, for example, be piggy-packed into the tunnel headers (e.g., GTP-u tunnel extension header). In an embodiment, the method may also include a step of splitting the flows.

Then, according to an embodiment, when a PDU is received, the method may include, at 410, checking the incoming PDU session ID and, if the incoming PDU session has been modified to type 'split', at 415, determining per QoS label to which tunnel the QoS flow is destined to. Based on that determination, the method may include, at 420, directing the flows (e.g., QoS flows) of the PDU session appropriately to the at least two gNB nodes for the transmission as an MCG bearer type in the MgNB and as an SCG bearer type in the SgNB.

Figure 4B:
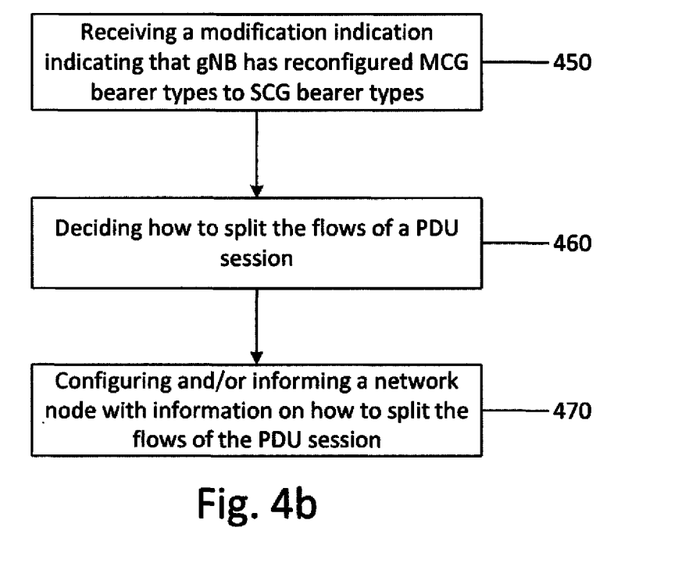
FIG. 4b illustrates an example flow diagram of a method, according to another embodiment.

FIG. 4b illustrates an example flow diagram of a method, according to one embodiment. The method of FIG. 4b may be performed, for example, by a network node, such as an access and mobility management entity or function (AMF) and/or a session management entity or function (SMF), or the like. As illustrated in FIG. 4b, the method may include, at 450, receiving a modification indication (e.g., NG-ModificationIndication) indicating that a gNB (e.g., MgNB) has reconfigured one or more of the MCG bearer types to SCG bearer types. In an embodiment, the method may then include, at 460, deciding how to split the flows (e.g., QoS flows) of a PDU session taking into account the QoS flows and their requirements for the PDU session to DRB mapping. According to one embodiment, the method may also include, at 470, configuring and/or informing the network node (e.g., UPF), which handles user-plane path switching between a master node B (e.g., MgNB) and secondary node B (e.g., SgNB), with information on how to split flows (e.g., QoS flows) of a PDU session into at least two gNB nodes for transmission as an MCG bearer type in a MgNB and as an SCG bearer type in a SgNB. In some embodiments, the configuring or informing of the network node may be done via a NG-ModificationIndication. As a result, the network node will know which flows it should direct to the MgNB for the DRB mapping and which flows it should direct to the SgNB for the DRB mapping.

Figure 4C:
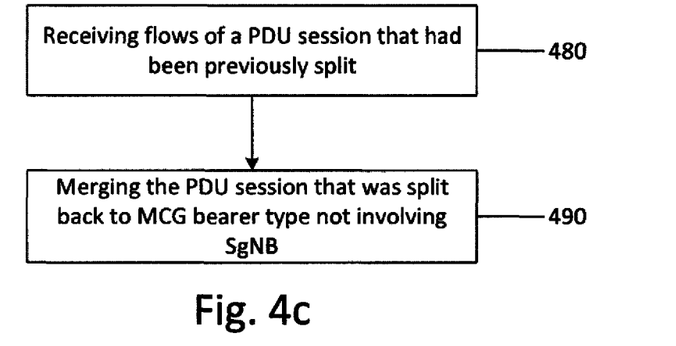
FIG. 4c illustrates an example flow diagram of a method, according to another embodiment.

FIG. 4c illustrates an example flow diagram of a method, according to another embodiment. The method of FIG. 4c may be performed, for example, by a network node that handles user-plane path switching between gNBs. For example, in an embodiment, the network node may be a UPF or the like. As illustrated in FIG. 4c, at 480, the method may include receiving flows of a PDU session that had been previously split to gNBs for transmission as MCG bearer type in a MgNB and as SCG bearer type in a SgNB. The method may then include, at 490, merging the PDU session that was split back to MCG bearer type not involving SgNB.

According to example embodiments, any of the network nodes alone or jointly may contain algorithms, measurements, monitoring, traffic analysis, decision operations for making the described configurations, reconfigurations and indications, and to decide how and where to transmit information related to them.

In view of the above, embodiments of the invention provide several technical effects and/or improvements and/or advantages. Certain embodiments can improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include receiving a configuration or modification indication comprising information for how to split flows (e.g., QoS flows) of a PDU session into at least two gNB nodes for transmission as an MCG bearer type in a MgNB and as an SCG bearer type in a SgNB. The method may then include directing the flows (e.g., QoS flows) of the PDU session appropriately to the at least two gNB nodes for the transmission as an MCG bearer type in the MgNB and as an SCG bearer type in the SgNB.

Another embodiment is directed to an apparatus that may include at least one processor and at least one memory including computer program code. The at least one memory and the computer program code are configured, with the at least one processor, to cause the apparatus at least to receive a configuration or modification indication comprising information for how to split flows (e.g., QoS flows) of a PDU session into at least two gNB nodes for transmission as an MCG bearer type in a MgNB and as an SCG bearer type in a SgNB. The at least one memory and the computer program code may be further configured, with the at least one processor, to cause the apparatus at least to direct the flows (e.g., QoS flows) of the PDU session appropriately to the at least two gNB nodes for the transmission as an MCG bearer type in the MgNB and as an SCG bearer type in the SgNB.

Another embodiment is directed to a method that may include deciding how to split the flows (e.g., QoS flows) of a PDU session taking into account the QoS flows and their requirements for the PDU session to DRB mapping. The method may also include configuring and/or informing a network node (e.g., UPF), which handles user-plane path switching between a master node B (e.g., MgNB) and secondary node B (e.g., SgNB), with information on how to split flows (e.g., QoS flows) of the PDU session into at least two gNB nodes for transmission as an MCG bearer type in the MgNB and as an SCG bearer type in the SgNB.

Another embodiment is directed to an apparatus that may include at least one processor and at least one memory including computer program code. The at least one memory and the computer program code are configured, with the at least one processor, to cause the apparatus at least to decide how to split the flows (e.g., QoS flows) of a PDU session taking into account the QoS flows and their requirements for the PDU session to DRB mapping. The at least one memory and the computer program code may be further configured, with the at least one processor, to cause the apparatus at least to configure and/or inform a network node (e.g., UPF), which handles user-plane path switching between a master node B (e.g., MgNB) and secondary node B (e.g., SgNB), with information on how to split flows (e.g., QoS flows) of the PDU session into at least two gNB nodes for transmission as an MCG bearer type in the MgNB and as an SCG bearer type in the SgNB.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the meters and bounds of example embodiments, reference should be made to the appended claims.

Partial Glossary

5G: Fifth Generation
5G-CN: Fifth Generation Core Network
AMF: Access and Mobility Management Function, the next generation network management function.
DRB: Data Radio Bearer
eLTE eNB: LTE eNB which is evolved to be able to connect to the 5G-CN
eNB: Evolved NodeB, LTE network node
EPC: Evolved Packet Core network
E-RAB: LTE Evolved Radio Access Bearer
gNB: NR NodeB, 5G network node
IP: Internet Protocol
MCG: Master Cell group
MeNB: LTE eNB acting in the role of master node for a UE
MgNB: NR gNB acting in the role of master node for a UE
MME: Mobility Management Function
MN: Master Node (role)
NG: Next Generation, i.e., the 5G
NR: New Radio, i.e., 5G radio
PDCP: Packet Data Convergence Protocol
PDU: Protocol Data Unit
PDU session: association between a UE and a data network that provides exchange of PDUs. PDU session association types include IP type, Ethernet type and non-IP type.
QoS: Quality of Service
RAN: Radio Access Network
NG-u: NG-interface in user-plane between the RAN and the 5G-CN
SCG: Secondary Cell Group
SDAP: Service Data Adaptation Protocol
SgNB: NR gNB acting in the role of secondary node for a UE
SGW: Serving Gateway
SMF: Session Management Function
SN: Secondary Node, a role of network node in dual connectivity. Node can be eNB or gNB.
UE: User Equipment
UPF: User Plane Function, which handles the user plane path of a PDU session.

We claim:

1. An apparatus, comprising:
at least one processor; and
at least one non-transitory memory comprising computer program code,
the at least one memory and computer program code configured, with the at least one processor, to cause the apparatus at least to:
receive an indication for how to split flows of at least one protocol data unit session into at least two flows through at least two network nodes, wherein at least a first flow is transmitted through a master network node and at least a second flow is transmitted through a secondary network node, wherein causing the apparatus at least to receive the indication comprises causing the apparatus at least to receive the indication from at least one of an access and mobility management function or a session management function; and
direct the flows of the at least one protocol data unit session for transmission, wherein the at least the first flow is transmitted through the master network node and wherein the at least the second flow is transmitted through the secondary network node, according to the received indication.

2. The apparatus according to claim 1, wherein the indication comprises at least one of a configuration, a configuration indication, or a modification indication.

3. The apparatus according to claim 1, wherein causing the apparatus at least to receive the indication comprises causing the apparatus at least to receive a modification indication for how to split flows when the master network node reconfigures one or more first bearers of the first flow into one or more second bearers of the second flow.

4. The apparatus according to claim 3, wherein causing the apparatus at least to receive the indication comprises causing the apparatus at least to receive the modification indication embedded on user plane information or in control plane signalling.

5. The apparatus according to claim 4, wherein the user plane information comprises general packet radio system tunnelling protocol user plane tunnel headers.

6. The apparatus according to claim 1, wherein the flows comprise quality of service flows.

7. The apparatus according to claim 1, wherein the at least one memory and computer program code are further configured, with the at least one processor, to cause the apparatus at least to:
check an incoming protocol data unit session; and
if the incoming protocol data unit session has been modified to 'split', determine, in accordance with a quality of service label, to which of the master network node or the secondary network node the flow of the incoming protocol data unit session is destined to.

8. The apparatus according to claim 1, wherein the at least one memory and computer program code are further configured, with the at least one processor, to cause the apparatus at least to:
receive flows of an incoming protocol data unit session, wherein the incoming session previously split to at least two split flows through the at least two network nodes; and
merge the split flows of the incoming session not involving the secondary network node.

9. An apparatus, comprising:
at least one processor; and
at least one non-transitory memory comprising computer program code,
the at least one memory and computer program code configured, with the at least one processor, to cause the apparatus at least to:

receive a modification indication indicating that a master network node has reconfigured one or more of a master cell group bearer to one or more of a secondary cell group bearer; and inform a user plane network node on how to split flows of a protocol data unit session into at least two flows for transmissions through at least two network nodes, wherein at least a first flow is transmitted through the master network node and at least a second flow is transmitted through a secondary network node;

wherein the apparatus comprises at least one of an access and mobility management function or session management function.

10. The apparatus according to claim 9, further comprising:

the informed user plane network node is a node that handles user-plane path switching between the master network node and a secondary network node.

11. The apparatus according to claim 9, wherein the at least one memory and computer program code are further configured, with the at least one processor, to cause the apparatus at least to negotiate the modification of the protocol data unit session with a session management function.

12. An apparatus, comprising:

at least one processor; and at least one non-transitory memory comprising computer program code, the at least one memory and computer program code configured, with the at least one processor, to cause the apparatus at least to:

transmit, to at least one of an access and mobility management function apparatus or a session management function apparatus, a modification indication indicating that a master network node has reconfigured one or more of a master cell group bearer to one or more of a secondary cell group bearer;

wherein the apparatus that transmits the modification indication forms part of the master network node; and wherein the at least one of the access and mobility management function apparatus or the session management function apparatus is configured to inform a user plane network node on how to split flows of at least one protocol data unit session into at least two flows for transmissions through at least two network nodes, wherein at least a first flow is transmitted through the master network node and at least a second flow is transmitted through a secondary network node.

13. The apparatus according to claim 12, wherein the modification indication comprises at least one of a configuration or a configuration indication.

14. The apparatus according to claim 12, further comprising causing the apparatus transmitting the indication at least to determine how to split flows of the at least one protocol data unit session into the at least two flows for transmissions through the at least two network nodes, with taking into account quality of service of the flows and requirements for mapping from the at least one session to at least one data radio bearer.

15. The apparatus according to claim 12, wherein the indication is transmitted when the master network node reconfigures any of master cell group bearer types to secondary cell group bearer types.

16. A method, comprising:

transmitting, with a master network node, to at least one of an access management function apparatus or session management function apparatus, a modification indication indicating that the master network node has reconfigured one or more of a master cell group bearer to one or more of a secondary cell group bearer;

wherein the at least one of the access and mobility management function apparatus or the session management function apparatus is configured to inform a user plane network node on how to split flows of at least one protocol data unit session into at least two flows for transmissions through at least two network nodes, wherein at least a first flow is transmitted through the master network node and at least a second flow is transmitted through a secondary network node.

17. The method according to claim 16, further comprising causing an apparatus transmitting the indication at least to determine how to split flows of the at least one protocol data unit session into the at least two flows for transmissions through the at least two network nodes, with taking into account quality of service of the flows and requirements for mapping from the at least one session to at least one data radio bearer.

18. The method according to claim 16, wherein the indication is transmitted when the master network node reconfigures any of master cell group bearer types to secondary cell group bearer types.

19. An apparatus, comprising:

at least one processor; and at least one non-transitory memory comprising computer program code, the at least one memory and computer program code configured, with the at least one processor, to cause the apparatus at least to:

receive at least one protocol data unit session that is split into delivery of at least two flows through at least two network nodes, wherein at least a first flow is transmitted through a master network node and at least a second flow is transmitted through a secondary network node;

receive the flows of the at least one protocol data unit session, wherein the at least one protocol data unit session previously split to at least two flows for transmission through the at least two network nodes; and merge the flows of the at least one protocol data unit session for transmission through the master network node and not to involve the secondary network node.

20. The apparatus of claim 19, wherein causing the apparatus at least to receive the indication comprises causing the apparatus at least to receive the indication directly from at least one of an evolved radio network node, an evolved long-term evolution radio network node, a fifth generation radio network node, or next generation radio network node.

* * * * *